(12) United States Patent
Heyl

(10) Patent No.: US 12,214,644 B2
(45) Date of Patent: Feb. 4, 2025

(54) THERMAL MANAGEMENT ARRANGEMENT FOR VEHICLES AND METHOD FOR OPERATING A THERMAL MANAGEMENT ARRANGEMENT

(71) Applicant: Hanon Systems, Daejeon (KR)

(72) Inventor: Peter Heyl, Cologne (DE)

(73) Assignee: HANON SYSTEMS, Daejeon (KR)

( * ) Notice: Subject to any disclaimer, the term of this patent is extended or adjusted under 35 U.S.C. 154(b) by 539 days.

(21) Appl. No.: 17/269,288

(22) PCT Filed: Aug. 14, 2019

(86) PCT No.: PCT/KR2019/010401
§ 371 (c)(1),
(2) Date: Feb. 18, 2021

(87) PCT Pub. No.: WO2020/050517
PCT Pub. Date: Mar. 12, 2020

(65) Prior Publication Data
US 2021/0252940 A1    Aug. 19, 2021

(30) Foreign Application Priority Data

Sep. 3, 2018 (DE) .................. 10 2018 121 390.5

(51) Int. Cl.
*B60H 1/00*     (2006.01)
*B60H 1/06*     (2006.01)
(Continued)

(52) U.S. Cl.
CPC ...... *B60H 1/00899* (2013.01); *B60H 1/00021* (2013.01); *B60H 1/00278* (2013.01);
(Continued)

(58) Field of Classification Search
CPC ............ B60H 1/00899; B60H 1/00021; B60H 1/00278; B60H 1/00492; B60H 1/00907;
(Continued)

(56) References Cited

U.S. PATENT DOCUMENTS 5,081,848 A * 1/1992 Rawlings ............... F24F 5/0046
165/45
5,553,662 A * 9/1996 Longardner .......... F24F 5/0021
165/902

(Continued)

FOREIGN PATENT DOCUMENTS

CA    2197223 A1 *  2/1996
DE    3704182 A1     8/1988
(Continued)

*Primary Examiner* — Ljiljana V. Ciric
(74) *Attorney, Agent, or Firm* — James D. Miller; Shumaker, Loop & Kendrick, LLP

(57) ABSTRACT

A thermal management arrangement for vehicles includes a refrigerant circuit having a chiller function and/or heat pump function and a heat carrier network for cooling and/or heating components of the vehicle. The heat carrier network has a heat carrier reservoir and a plurality of heat carrier supply segments fed from the heat carrier reservoir. A separately controlled and regulated ambient heat exchanger supply segment implements a circuit having a central low-temperature ambient heat exchanger and least one heat carrier reservoir.

11 Claims, 2 Drawing Sheets

(51) Int. Cl.
  *B60H 1/14* (2006.01)
  *B60H 1/26* (2006.01)
  *B60H 1/32* (2006.01)
  *F25B 9/00* (2006.01)
  *F25B 25/00* (2006.01)
  *F25B 30/02* (2006.01)
  *F25B 40/00* (2006.01)

(52) U.S. Cl.
  CPC ..... *B60H 1/00492* (2013.01); *B60H 1/00907* (2013.01); *B60H 1/06* (2013.01); *B60H 1/143* (2013.01); *B60H 1/26* (2013.01); *B60H 1/3213* (2013.01); *B60H 1/3228* (2019.05); *B60H 1/32284* (2019.05); *F25B 9/008* (2013.01); *F25B 25/005* (2013.01); *F25B 30/02* (2013.01); *B60H 2001/00307* (2013.01); *B60H 2001/00928* (2013.01); *B60H 2001/00949* (2013.01); *F25B 40/00* (2013.01); *F25B 2339/047* (2013.01); *F25B 2400/121* (2013.01)

(58) Field of Classification Search
  CPC . B60H 1/06; B60H 1/143; B60H 1/26; B60H 1/3228; B60H 2001/00307; B60H 2001/00957; B60H 2001/00949; B60H 1/3213; B60H 1/32284; B60H 2001/00928; F25B 9/008; F25B 25/005; F25B 30/02; F25B 2339/047; F25B 2400/121; F25B 40/00
  See application file for complete search history.

(56) References Cited

U.S. PATENT DOCUMENTS

| | | | | |
|---|---|---|---|---|
| 5,871,041 A * | 2/1999 | Rafalovich | ........ | B60H 1/00492 165/41 |
| 6,018,954 A * | 2/2000 | Assaf | ........ | F24F 5/0014 62/271 |
| 6,047,770 A * | 4/2000 | Suzuki | ........ | B60H 1/3204 62/526 |
| 6,059,016 A * | 5/2000 | Rafalovich | ........ | F28D 20/02 165/41 |
| 6,062,035 A * | 5/2000 | Ueno | ........ | F25B 13/00 62/434 |
| 6,640,889 B1 * | 11/2003 | Harte | ........ | B60H 1/32284 62/238.7 |
| 6,775,996 B2 * | 8/2004 | Cowans | ........ | B23Q 11/143 62/201 |
| 6,793,007 B1 * | 9/2004 | Kramer | ........ | H01L 23/4735 165/80.4 |
| 6,928,831 B2 * | 8/2005 | Heyl | ........ | B60H 1/00907 62/93 |
| RE39,288 E * | 9/2006 | Assaf | ........ | F24F 3/1417 62/271 |
| 7,182,129 B2 * | 2/2007 | Karl | ........ | B60H 1/20 62/238.7 |
| 7,905,110 B2 * | 3/2011 | Reich | ........ | F25B 29/003 126/400 |
| 8,418,481 B2 * | 4/2013 | Minor | ........ | C09K 5/041 62/79 |
| 8,607,855 B2 * | 12/2013 | Feuerecker | ........ | B60H 1/00907 62/238.7 |
| 8,707,723 B2 * | 4/2014 | Narayanamurthy | .... | F25D 16/00 62/333 |
| 9,482,117 B2 * | 11/2016 | Davidson | ........ | F01K 25/10 |
| 9,796,241 B2 * | 10/2017 | Takeuchi | ........ | B60L 53/14 |
| 9,821,630 B2 * | 11/2017 | Goenka | ........ | B60H 1/005 |
| 9,835,361 B2 * | 12/2017 | El-Shaarawi | ........ | F25B 41/28 |
| 10,021,970 B2 * | 7/2018 | Lu | ........ | B64D 11/04 |
| 10,047,985 B2 * | 8/2018 | Kopko | ........ | F28D 20/0039 |
| 10,145,270 B2 * | 12/2018 | Davidson | ........ | F01K 3/00 |
| 10,156,392 B2 * | 12/2018 | Kurata | ........ | F25B 49/027 |
| 10,183,549 B2 * | 1/2019 | Koberstein | ........ | B60H 1/00385 |
| 10,279,647 B2 * | 5/2019 | Tasiopoulos | ........ | B60H 1/00921 |
| 10,371,428 B2 * | 8/2019 | Kopko | ........ | F25D 3/005 |
| 10,465,952 B2 * | 11/2019 | He | ........ | F25B 47/022 |
| 10,473,366 B2 * | 11/2019 | Ma | ........ | F25B 25/005 |
| 10,486,494 B2 * | 11/2019 | Koberstein | ........ | B60H 1/00899 |
| 10,598,395 B2 * | 3/2020 | Attari | ........ | F24F 11/65 |
| 10,641,535 B2 * | 5/2020 | Murgham | ........ | F25B 6/04 |
| 10,648,714 B2 * | 5/2020 | Van Gysel | ........ | F25B 30/02 |
| 10,690,389 B2 * | 6/2020 | Dube | ........ | F25B 5/02 |
| 10,737,552 B2 * | 8/2020 | He | ........ | F25B 41/20 |
| 10,906,376 B2 * | 2/2021 | Enomoto | ........ | F01P 7/161 |
| 10,907,869 B2 * | 2/2021 | Hagh | ........ | F25B 40/00 |
| 11,073,311 B2 * | 7/2021 | Warner | ........ | F25B 49/022 |
| 11,254,190 B2 * | 2/2022 | He | ........ | F25B 6/04 |
| 11,358,493 B2 * | 6/2022 | Cohan | ........ | B60L 58/34 |
| 11,364,767 B2 * | 6/2022 | Kitamura | ........ | B60H 1/04 |
| 11,370,264 B2 * | 6/2022 | He | ........ | F25D 17/02 |
| 11,421,914 B2 * | 8/2022 | Liu | ........ | F25B 30/06 |
| 11,441,826 B2 * | 9/2022 | Schreiber | ........ | F28D 5/02 |
| 11,466,912 B2 * | 10/2022 | Bradshaw | ........ | B60H 1/00585 |
| 11,530,844 B2 * | 12/2022 | Unton | ........ | F25B 6/02 |
| 11,613,154 B2 * | 3/2023 | He | ........ | B60H 1/32281 62/498 |
| 11,662,127 B2 * | 5/2023 | Deivasigamani | ........ | F25B 49/02 62/160 |
| 11,692,779 B2 * | 7/2023 | Rockenfeller | ........ | F25B 25/005 165/10 |
| 11,718,148 B2 * | 8/2023 | Porras | ........ | B60H 1/32281 62/193 |
| 11,788,777 B2 * | 10/2023 | Ito | ........ | F25B 41/40 62/238.6 |
| 11,796,226 B2 * | 10/2023 | Unton | ........ | F25B 6/02 |
| 11,846,454 B2 * | 12/2023 | Temple | ........ | F25B 49/02 |
| 11,852,382 B2 * | 12/2023 | Mokheimer | ........ | F24T 50/00 |
| 11,873,998 B2 * | 1/2024 | Fread | ........ | G05D 23/1919 |
| 2003/0154730 A1 * | 8/2003 | Leuthner | ........ | F25B 9/008 62/324.1 |
| 2004/0089003 A1 * | 5/2004 | Amaral | ........ | B60H 1/32284 62/159 |
| 2005/0039878 A1 * | 2/2005 | Meyer | ........ | F25B 29/003 62/324.1 |
| 2006/0137388 A1 * | 6/2006 | Kakehashi | ........ | F25B 5/02 62/524 |
| 2009/0139255 A1 * | 6/2009 | Hombucher | ........ | F24D 11/0214 62/324.4 |
| 2011/0048671 A1 * | 3/2011 | Nishikawa | ........ | B60H 1/3213 165/42 |
| 2011/0154839 A1 * | 6/2011 | Mihara | ........ | F25B 9/008 62/177 |
| 2011/0197611 A1 * | 8/2011 | Hall | ........ | B60H 1/00378 62/238.7 |
| 2011/0296855 A1 | 12/2011 | Johnston et al. | | |
| 2012/0174602 A1 * | 7/2012 | Olivier | ........ | B60H 1/32284 62/238.1 |
| 2014/0060794 A1 * | 3/2014 | Ishii | ........ | B60H 1/00885 165/287 |
| 2014/0208793 A1 * | 7/2014 | Goenka | ........ | B60H 1/00335 62/404 |
| 2014/0208794 A1 * | 7/2014 | Goenka | ........ | B60H 1/00328 62/404 |
| 2015/0128632 A1 * | 5/2015 | Kishita | ........ | B60H 1/00278 165/61 |
| 2015/0314669 A1 * | 11/2015 | Noda | ........ | F25B 41/20 62/324.1 |
| 2016/0082805 A1 * | 3/2016 | Graaf | ........ | B60H 1/04 62/238.7 |
| 2016/0153343 A1 * | 6/2016 | Kakehashi | ........ | B60H 1/00885 123/41.31 |
| 2016/0159199 A1 * | 6/2016 | Kuroda | ........ | F25B 6/02 165/42 |
| 2016/0214461 A1 * | 7/2016 | Kuroda | ........ | B60H 1/00885 |
| 2017/0182866 A1 * | 6/2017 | Onishi | ........ | B60H 1/00778 |
| 2017/0274727 A1 * | 9/2017 | Tasiopoulos | ........ | B60H 1/00271 |
| 2017/0297414 A1 * | 10/2017 | Beloe | ........ | B60H 1/00885 |
| 2017/0363315 A1 * | 12/2017 | Kawabata | ........ | F24F 11/89 |

(56) References Cited

U.S. PATENT DOCUMENTS

| | | | |
|---|---|---|---|
| 2018/0208019 A1* | 7/2018 | Sugimura | B60H 1/00735 |
| 2018/0347874 A1* | 12/2018 | Kopko | F25B 40/02 |
| 2018/0361828 A1* | 12/2018 | Kato | F25B 6/04 |
| 2020/0047591 A1* | 2/2020 | He | B60H 1/32284 |
| 2021/0123643 A1* | 4/2021 | Temple | F25B 30/06 |
| 2021/0252940 A1* | 8/2021 | Heyl | B60H 1/3228 |
| 2021/0394580 A1* | 12/2021 | Chopard | B60L 1/02 |
| 2022/0011006 A1* | 1/2022 | Miura | B60H 1/143 |
| 2022/0115719 A1* | 4/2022 | King | H01M 10/663 |
| 2022/0161633 A1* | 5/2022 | Galansky | F25B 6/04 |
| 2023/0090996 A1* | 3/2023 | Giroldo | H01M 8/04029 180/65.31 |
| 2023/0111690 A1* | 4/2023 | Stewart Lang | C09K 5/041 62/285 |
| 2023/0173891 A1* | 6/2023 | Heyl | B60H 1/32284 62/115 |
| 2023/0272953 A1* | 8/2023 | Deivasigamani | F25B 30/02 62/160 |
| 2023/0332807 A1* | 10/2023 | MacCracken | F24D 11/0221 |

FOREIGN PATENT DOCUMENTS

| | | | | |
|---|---|---|---|---|
| DE | 19731185 A1 | | 1/1999 | |
| DE | 102009028332 A1 | | 2/2011 | |
| DE | 202010007146 U1 | | 9/2011 | |
| DE | 102013206626 A1 | | 10/2014 | |
| DE | 112015000552 T5 | | 11/2016 | |
| DE | 112020001650 T5 | * | 12/2021 | ......... B60H 1/00921 |
| DE | 112014002448 B4 | * | 3/2022 | ......... B60H 1/00492 |
| EP | 2977254 A1 | | 1/2016 | |
| EP | 2910869 B1 | * | 3/2021 | ............. B29C 43/02 |
| EP | 4006444 A1 | * | 6/2022 | ......... B60H 1/00371 |
| JP | H10504257 A | * | 4/1998 | |
| JP | H11286211 A | | 10/1999 | |
| JP | 6167892 B2 | | 7/2017 | |
| JP | 6973446 B2 | * | 11/2021 | ......... B60H 1/00271 |
| KR | 20180003985 A | | 1/2018 | |
| KR | 20180065348 A | | 6/2018 | |
| KR | 20180078073 A | | 7/2018 | |
| KR | 20180093184 A | | 8/2018 | |

* cited by examiner

THERMAL MANAGEMENT ARRANGEMENT FOR VEHICLES AND METHOD FOR OPERATING A THERMAL MANAGEMENT ARRANGEMENT

CROSS-REFERENCE TO RELATED APPLICATIONS

This patent application is a United States nation phase patent application based on PCT/KR2019/010401 filed on Aug. 14, 2019, which claims the benefit of German Patent Application No. DE 10 2018 121 390.5 filed on Sep. 3, 2018, the entire disclosures of which are hereby incorporated herein by reference.

TECHNICAL FIELD

The invention relates to a thermal management arrangement and a method for operating a thermal management arrangement.

BACKGROUND ART

A thermal management arrangement in the sense of the invention is understood to be a device for implementing the supply of a vehicle with heat and/or cold. Waste heat is optionally emitted to the surrounding area, or, in the case of a heat deficit, heat from the surrounding area is taken up by the thermal management arrangement in order to be made available in the vehicle at a corresponding temperature level.

The area of application of a thermal management arrangement is particularly in vehicles with high-efficiency combustion engines, and in hybrid and electric vehicles.

In the prior art, a plurality of coolant circuits or refrigerant circuits are sometimes installed in vehicles, emitting waste heat to the surrounding area via a plurality of various heat exchangers in the front end of a vehicle. This leads to large-volume heat exchanger packages, wherein difficulties often arise in finding satisfactory fluidic solutions for the heat transfer tasks, because the heat exchangers must share the limited fluidically advantageous space, or less advantageous conditions must be deliberately accepted.

Furthermore, the problem in modern vehicles with efficient combustion engines, or hybrid and electric vehicles, is that insufficient heat is generated in the engine at the necessary temperature level, so that any available waste heat is used with a heat pump, for example, to provide sufficient heating of the vehicle interior or heating of other components.

In vehicles according to the prior art, the waste heat of the air conditioning system is still discharged to the surrounding area by means of a separate, additional air-to-air heat exchanger, or, in the winter, heat is taken in as an evaporator via said air-to-air heat exchanger.

An example of a thermal management arrangement according to the prior art is described in JP 19990286211 A2.

A disadvantage of the systems according to the prior art is that various technical solutions are implemented in parallel, leading to a high installation space requirements for the overall systems, and a negative mutual influence of the solutions cannot reach the desired high efficiency.

The experts also seek to reduce refrigerant fill levels in the refrigerant circuits, which is desirable for commercial, ecological, and safety reasons, and so that refrigerants having greater safety requirements can be used.

DISCLOSURE OF INVENTION

The object of the invention is to provide a thermal management arrangement and method for operating such a thermal management arrangement for vehicles, taking up as little space as possible in the vehicle, simple in construction, and using a simple refrigerant circuit having main components thereof, and for operating with a natural refrigerant, such as carbon dioxide, propane, propylene, isobutane, ammonia, as well as chemical refrigerant and chemical refrigerant mixtures.

An efficient thermal management concept is also made possible, whereby as a result sufficient heat is available for heating the vehicle.

The object is achieved by a thermal management arrangement and method for operating such a thermal management arrangement having the features as disclosed herein.

The object of the invention is particularly achieved by a thermal management arrangement for vehicles, comprising the basic components of a refrigerant circuit and a heat carrier network. The refrigerant circuit can be operated in both the chiller and the heat pump function modes. This means that, depending on the switching of the heat exchanger, the condenser and the heat of condensation arising thereof can be used for heating purposes, and that on the other side, the evaporator can be used for cooling and serves for absorbing heat in the refrigerant circuit when switched to heat pump mode. The operation of the refrigerant circuit is always the same, that is, the evaporator or condenser is always functionally an evaporator or a condenser. The water circuit is equipped with valves accordingly. The heat carrier network is a pipeline system serving for transporting heat carrier fluid, particularly a water/glycol mixture, for cooling and heating components of the vehicle. The heat carrier network comprises at least one heat carrier reservoir, also referred to and implemented as a central water/glycol tank, serving as a store, distributor, and collector of heat carrier mass flows. The store can be operated using water or additionally using PCM (phase change materials) or ice slush for increasing the heating or chilling capacity In addition, additional stores, such as PCM or ice slush stores, can be connected to said central water/glycol tank and used for covering performance peaks under maximum cooling/heating demand. The heat carrier network and thus a plurality of heat carrier supply segments are fed from the heat carrier reservoir and can be modularly switched to various circuits. The circuits formed serve for the various components using the reservoir, depending on switching, and for receiving heat or emitting heat via a heat carrier supply segment implementing a circuit having a central low-temperature ambient heat exchanger.

Thus there are three types of heat carrier supply segments to be differentiated within the heat carrier network.

The first type relates to the ambient heat carrier supply segment, connecting the heat carrier reservoir to the low-temperature ambient heat exchanger. By means of the low-temperature ambient heat exchanger, waste heat is transferred out of the thermal management arrangement to the surrounding area, or ambient heat is transferred into the thermal management arrangement from the surrounding area by means of the low-temperature ambient heat exchanger.

The second type of heat carrier supply segment connects individual components into a circuit, switched to connect to the heat carrier reservoir depending on the heat transfer task.

Finally, a third type of heat carrier supply segment is differentiated, and is formed in that a subcircuit is switched to connect within the heat carrier network and is not connected to the heat carrier reservoir.

A heat carrier pump and a heat carrier distributor unit are preferably disposed at the heat carrier reservoir, so that the heat transfer fluid can flow by means of the pump through the heat carrier supply segments connected in the circuit having the heat carrier reservoir.

Heat transfer fluid flows within the heat carrier network are switched by means of the heat carrier distributor unit to connect to the outlet of the heat carrier reservoir.

According to an advantageous embodiment of the invention, a separately controlled and regulated evaporator heat carrier supply segment implements a circuit having the heat carrier reservoir), the component heat exchangers and/or a battery heat exchanger, and an evaporator of the refrigerant circuit.

A heat carrier pump is preferably disposed downstream of the evaporator in the flow direction in the evaporator heat carrier supply segment.

According to a further advantageous embodiment of the invention, a separately controlled and regulated condenser heater heat carrier supply segment implements a temporarily closed circuit having the condenser of the refrigerant circuit and a heater heat exchanger, wherein a heat carrier pump is disposed in the condenser heater heat carrier supply segment.

A separately controlled and regulated component cooler heat carrier supply segment is advantageously provided for implementing a circuit having the heat carrier reservoir and the component heat exchangers within the thermal management arrangement.

According to a further advantageous embodiment of the thermal management arrangement, a separately controlled and regulated condenser cooler heat carrier supply segment implements a circuit having the heat carrier reservoir, the condenser of the refrigerant circuit, and the heater heat exchanger.

A separately controlled and regulated cooler heat carrier supply segment advantageously implements a circuit having the evaporator of the refrigerant circuit and/or the battery heat exchanger and/or the cooler.

According to a further preferred embodiment, a separately controlled and regulated component heater heat carrier supply segment implements a circuit having the heat carrier reservoir, the component heat exchangers, and/or the battery heat exchanger, and/or the cooler and the evaporator of the refrigerant circuit.

An electrical supplemental heater is advantageously disposed in the heat carrier network.

Additional energy stores can be advantageously disposed in the circuit. Said stores can be used for bringing high load points, such as fast battery charging, to the desired temperature level in advance.

A refrigerant used in the refrigerant circuit is preferably selected from the 20 refrigerants R290 or R1270, R134a, R152a, R1234yf, R1234zf, R744, or R600a.

The object of the invention is further achieved by a method for operating a thermal management arrangement according to the preceding preferred embodiments, wherein in combined cooling and heating mode, the condenser heater heat carrier supply segment, the evaporator heat carrier supply segment, and, depending on the temperature level of the heat carrier in the heat carrier reservoir, the ambient heat carrier supply segment and the refrigerant circuit are connected by switching.

According to an alternative method for operating a thermal management arrangement, in cooling mode the cooling heat carrier supply segment, the condenser cooler heat carrier supply segment, and component cooler heat carrier supply segment, the ambient heat carrier supply segment, and the refrigerant circuit are connected by switching.

According to a further alternative method for operating a thermal management arrangement, in heating mode the component heater heat carrier supply segment, the condenser heater heat carrier supply segment, the ambient heat carrier supply segment, and the refrigerant circuit are connected by switching.

The concept of the invention is that by combining the substantial components of the thermal management arrangement with the refrigerant circuit and heat carrier network, a plurality of air-to-air heat exchangers for coupling heat into or out of the surrounding area, can be joined to form a low-temperature ambient heat exchanger. The resulting size provides the low-temperature ambient heat exchanger with a sufficient size for fast-charging the battery when the vehicle is stationary, in order to dissipate the very high power levels (up to 30-40 kW) to the surrounding area. The refrigerant heat exchangers supplied with water are substantially easier to handle due to the good heat transfer properties of both fluids. The heat carrier reservoir integrated in the thermal management arrangement allows storing and thus buffering of heat.

The core points of the thermal management according to the invention are explained in the embodiment examples in the principle sketches shown.

The low-temperature ambient heat exchanger is a heat exchanger disposed in the front end of the vehicle and can emit heat to the surrounding area or also absorb heat from the surrounding area.

The central water/glycol tank, also referred to as the heat carrier reservoir, functions as a distributor and collector of all heat carrier flows, with the exception of heating in heat pump mode.

The heat carrier reservoir can additionally comprise a pump and a distributor unit correspondingly transporting and distributing the water/glycol mixture.

According to the need for heat or cooling, a corresponding heat carrier or water mass flow is provided to the heat exchanger at the front end in contact with the surrounding area. In heat pump mode, said arrangement is particularly advantageous, because a heat flow can be received from the ambient air by means of a high water mass flow and low temperature differential to the surrounding area, and does not lead to icing of the heat exchanger.

It is further advantageous that the water as a heat carrier fluid does not change temperature due to pressure losses, as is typical for refrigerants. It is further advantageous that the low-temperature ambient heat exchanger is substantially larger than a single condenser of a refrigerant circuit acting as an evaporator can be. Sufficient heat can thus be received at a low temperature differential from the surrounding area.

The advantages of the invention are that a simple system is made available and can use all available heat flows.

Said system advantageously comprises only one heat exchanger in contact with the surrounding area. Better crash classification of the vehicle could also therefore be possible.

A particularly notable advantage is that the refrigerant circuit manages with a lower level of fluid, and the potential exists for using propane or other refrigerants having higher safety requirements but significantly better thermodynamic properties.

BRIEF DESCRIPTION OF THE DRAWINGS

Further details, features, and advantages of embodiments of the invention result from the following description of embodiment examples, with reference to the associated drawings. They show.

MODE FOR THE INVENTION

Figure 1:
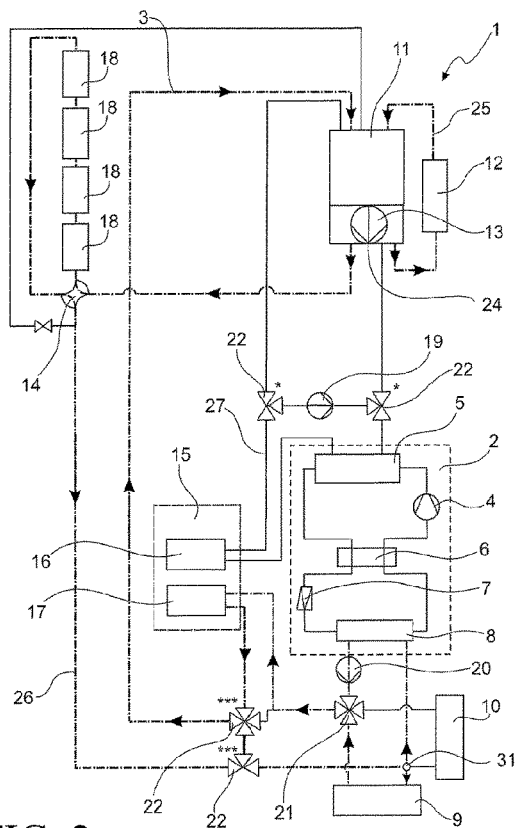
FIG. 1: principle schematic of a thermal management arrangement in combined cooling and heating mode.

FIG. 1 shows the principle schematic of a thermal management arrangement 1 in combine cooling and heating mode. The active areas of the heat carrier network 3, also referred to as heat carrier supply segments, are shown by means of arrowheads indicating the flow direction of the heat carrier fluid. The combined cooling and heating mode shown is an application case particularly in the transitional seasons in spring and fall.

The thermal management arrangement 1 comprises two main components, the refrigerant circuit 2 and the heat carrier network 3. The refrigerant circuit 2 is shown schematically in the basic form thereof and comprises the components evaporator pump 4, condenser/gas cooler 5, inner heat exchanger 6, expansion organ or expansion valve 7, and evaporator 8 connected in a circuit. The inner heat exchanger 6 is also referred to as the subcooling counterflow and is advantageously integrated in the refrigerant circuit 2, depending on the refrigerant used, but is not absolutely necessary. The refrigerant circuit can also be implemented for producing work, having two-stage compression and corresponding cooling and two-stage expansion.

The thermal management arrangement 1 further comprises the heat carrier network 3 serving for transporting a heat carrier fluid, transporting both heat and cold to the consumers. The heat carrier fluid in general is a mixture of water and glycol from the motor vehicle sector, but other heat carrier fluids for special cases are also conceivable. The heat carrier network 3 is connected by switching in various areas, also referred to as heat carrier supply segments, depending on the application of the thermal management arrangement 1, in order to implement particular heat transfer functions for various components of the thermal management arrangement 1.

A core element of the heat carrier network 3 is the heat carrier reservoir 11 for functionally storing a large quantity of heat carrier fluid. From this central heat carrier reservoir 11, the heat carrier fluid is transported to particular areas of the heat carrier network 3. For an even more complex heat carrier network 3, said network can also be equipped with a plurality of heat carrier reservoirs connected to each other or working separately, depending on the application. Said reservoirs can also be optionally insulated.

To this end, the heat carrier pump 13 is advantageously disposed directly on the heat carrier reservoir 11 and transports the heat carrier fluid via a heat carrier distributor unit 24 to the corresponding connected areas of the heat carrier network 3. The ambient heat carrier supply segment 25 has a particularly notable role within the heat carrier network 3. A low-temperature ambient heat exchanger 12 is connected in the ambient heat carrier supply segment. The ambient heat carrier supply segment 25 forms a circuit of the heat reservoir 11, heat carrier pump 13, optionally the heat carrier distribution unit 24, and the low-temperature ambient heat exchanger 12. All heat exchanges, that is, the absorbing or emitting of heat to the surrounding area or from the surrounding area, take place by means of the low-temperature ambient heat exchanger 12, typically disposed centrally in the front end of the motor vehicle. The heat carrier fluid 11 is correspondingly supplied with heat from the surrounding area by means of the ambient heat carrier supply segment 25, or heat from the heat carrier fluid is emitted to the surrounding area from the heat carrier reservoir 11 by means of the low-temperature ambient heat exchanger 12. In contrast to thermal management arrangements according to the prior art, the heat exchange from or to the surrounding area takes place exclusively by means of a single, central heat exchanger implemented and referred to as a low-temperature ambient heat exchanger 12.

In the operating mode for combined cooling and heating shown in FIG. 1, in addition to the ambient heat carrier supply segment 25 described above, further heat carrier supply segments are also connected.

The condenser heater heat carrier supply segment 27 forms a circuit of the condenser/gas cooler 5 of the refrigerant circuit by means of the heater heat exchanger 16 of the ventilation system 15, and said separate heat carrier supply segment is driven by a heat carrier pump 19 in this case. For connecting the individual lines, in the embodiment example according to FIG. 1 two three-way valves 22 are provided, by means of which the circuit is connected within the heat carrier network 3.

An evaporator heat carrier supply segment 26 is further active in the described circuit configuration of the heat carrier network 3, forming a circuit starting from the heat carrier reservoir 11, through the heat carrier pump 13 and the heat carrier distributor unit 24. As shown in the principle schematic, a plurality of component heat exchangers 18 are optionally connected via a four-way valve 14, toward the evaporator 8 of the refrigerant circuit 2, and incorporated in the circuit by means of the heat carrier pump 20 and the air cooler 17 of the ventilation system 15 of the vehicle. Finally, the lines of the circuit are routed back the heat carrier reservoir 11.

A parallel branch is optionally provided by means of a branching point 31, by means of which the heat carrier fluid is routed from the heat carrier reservoir 11 to a battery heat exchanger 9 and then via a multi-way valve 21 to the heat carrier reservoir 11. In the depiction according to FIG. 1, a cooler 10 is additionally shown, but is not incorporated in the active heat carrier supply segments in the present control and circuit variant.

Figure 2:
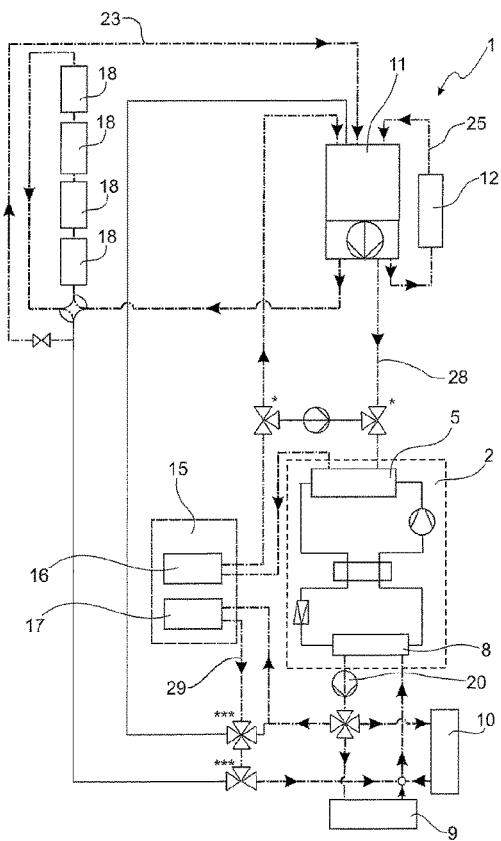
FIG. 2: thermal management arrangement in cooling mode.

FIG. 2 shows a principle schematic of a thermal management arrangement 1 in cooling mode, in demand particularly for cooling the vehicle in the warm season of summer. In addition to directly cooling the vehicle interior for the comfort of the vehicle occupants, important components of the drive system and the electronic components and the battery are also cooled, for example.

In the present application mode for cooling, the ambient heat carrier supply segment 25 having the low-temperature ambient heat exchanger 12 is optionally activated and again separately controlled and regulated. In addition, the functionally important cooling heat carrier supply segment 29 is also connected and supplies by means of the heat carrier pump 20 the evaporator 8 having the air cooler 17, and in parallel the battery heat exchanger 9 and optionally additionally the cooler 10 with heat carrier fluid cooled in the evaporator 8. Said heat carrier supply segment is not connected to the heat carrier reservoir 11 in the present circuit variant.

Heat carrier fluid from the heat carrier reservoir 11 is provided to the component heat exchangers 18 in the component cooler heat carrier supply segment 23.

The heat carrier reservoir 11 is further connected to the condenser/gas cooler 5 by means of the condenser cooler heat carrier supply segment 28, and further connected as a circuit to the heater heat exchanger 16 of the ventilation system 15 of the vehicle. The cooling of the components by heat carrier fluid by means of the heat carrier reservoir 11 occurs by cooling the heat carrier reservoir 11 to the ambient level, plus the temperature different of the low-temperature ambient heat exchanger 12, by means of the low-temperature ambient heat exchanger 12.

Cooling of the batteries by means of the battery heat exchanger 9 and cooling of the vehicle cabin by means of the ventilation system 15 and the air cooler 17 are done by means of the refrigerant circuit 2, working as a chiller.

Figure 3:
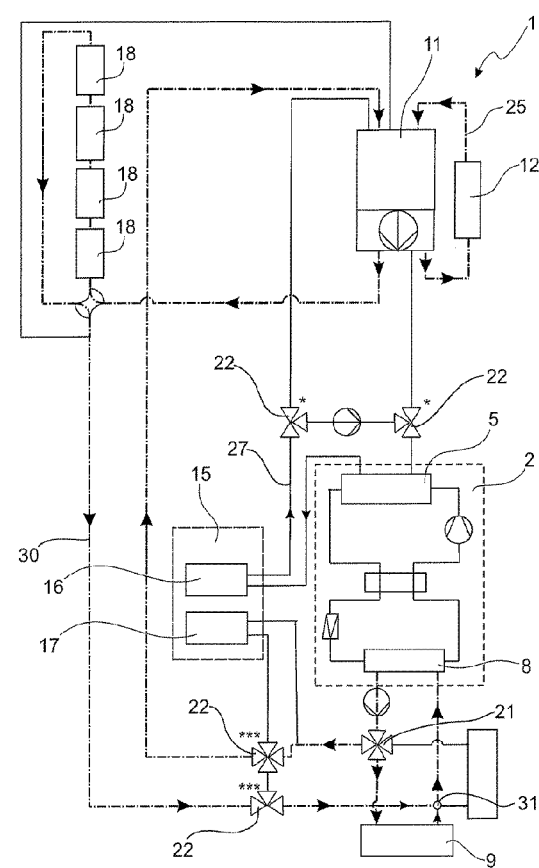
FIG. 3: thermal management arrangement in heating mode.

FIG. 3 shows a principle depiction of a thermal management arrangement 1 in heating mode. For the heating principle, it is particularly significant, particularly for vehicles having high-efficiency combustion engines, having an additional high-temperature ambient heat exchanger in the front end, and for hybrid and electric vehicles, that heat is supplied by means of heat pump circuits and functions of the thermal management arrangement 1. The low-temperature ambient heat exchanger 12 within the ambient heat carrier supply segment 25 thereby functions as a coupling element of the thermal management arrangement 1 to the surrounding area for absorbing ambient heat, with the goal of subsequently transforming and further using the ambient heat for heating tasks within the vehicle. The heat carrier reservoir 11 is connected to the evaporator 8 of the refrigerant circuit 2 within the component heater heat carrier supply segment 30 by means of the component heat exchanger 18. In parallel, by means of the branching point 31, functioning here as a collector point, the battery heat exchanger 9 is also incorporated after the evaporator 8 in parallel with the component heater heat carrier supply segment 30. In the present circuit variant, the condenser heater heat carrier supply segment 27 in turn is not connected to the heat carrier reservoir 11, and forms a circuit only with the condenser 5 of the refrigerant circuit 2 and the heater heat exchanger 16 of the ventilation system 15. For implementing the circuits, multi-way valves 21 and three-way valves 22 are used in a typical fashion.

A thermal management arrangement 1 is thereby provided in various functional types of combined cooling and heating operation, of cooling operation, and of heating operation, by means of a single, modularly constructed thermal management arrangement 1.

It is particularly advantageous when implementing in vehicles that only one low-temperature ambient heat exchanger 12, separately controlled and regulated depending on the required temperature level of the heat carrier fluid, and connected to the heat carrier reservoir 11, is required, bringing advantages in cost, weight, and space.

Different volume flow rates can be advantageously implemented in the heat carrier network. In current systems, the condenser is operated as an evaporator in heat pump mode. In order to prevent the same from icing, said condenser is operated at a low temperature differential between the refrigerant and the surrounding area. This has a limiting effect on overheating the refrigerant, however, but also on the heat source power to be absorbed from the surrounding area. In addition, the pressure loss of the condenser operated as an evaporator, wherein the required evaporator operation leads to an increase in installation space in many cases, for example from 12 mm to 16 mm pressure drop requirement. In heat pump mode, a volume flow rate of 202-300 l/h is implemented in the evaporator heat carrier supply segment 26, for example, while the volume flow rate in the ambient heat carrier supply segment 25 is between 1000-1500 l/h. It is thereby possible to absorb a high heat source power from the surrounding area at a very low temperature differential, without icing the low-temperature ambient heat exchanger 12, and the refrigerant circuit can be operated at a low but safe overheating. Additional necessary electrical de-icing functions or enlarging of the line diameter of the entire heat carrier network are eliminated. If de-icing is required, then opening the three-way valve 22 or raising the temperature in the heat carrier reservoir 11 is sufficient.

The cooling by means of the evaporator can also be performed by means of refrigerant directly, or by a combination of directly and indirectly.

The heat carrier reservoir 11 can also be advantageously implemented in the form of_at least two tanks selectively connected or not connected to each other.

The invention relates to a thermal management arrangement and a method for operating a thermal management arrangement.

The invention claimed is:

1. A thermal management arrangement for a vehicle comprising:
    a refrigerant circuit; and
    a heat carrier network controlling a temperature of components of the vehicle, wherein the heat carrier network further comprises:
    a heat carrier reservoir; and
    a plurality of heat carrier supply segments fed from the heat carrier reservoir, wherein a separately controlled and regulated ambient heat carrier supply segment provides a circuit having a central low-temperature ambient heat exchanger and the heat carrier reservoir, and wherein a heat carrier fluid is supplied with heat from a surrounding area by means of the ambient heat carrier supply segment, or heat from the heat carrier fluid is emitted to the surrounding area from the heat carrier reservoir by means of the low-temperature ambient heat exchanger.

2. The thermal management arrangement according to claim 1, wherein the heat carrier reservoir and a heat carrier pump are disposed in series.

3. The thermal management arrangement according to claim 1, wherein a storage medium is disposed in the heat carrier reservoir, or in series or parallel to the heat carrier network.

4. The thermal management arrangement according to claim 1,
    wherein a separately controlled and regulated evaporator heat carrier supply segment provides a circuit having at least one of the heat carrier reservoir, component heat exchangers, a battery heat exchanger, and an evaporator of the refrigerant circuit.

5. The thermal management arrangement according to claim 1, wherein a separately controlled and regulated evaporator heat carrier supply segment provides a circuit having a battery heat exchanger and an evaporator of the refrigerant circuit, and wherein a heat carrier pump is disposed downstream of the evaporator in the evaporator heat carrier supply segment.

6. The thermal management arrangement according to claim 1, wherein a separately controlled and regulated condenser heater heat carrier supply segment provides a circuit having a condenser of the refrigerant circuit and a heater heat exchanger, and
    wherein a heat carrier pump is disposed in the condenser heater heat carrier supply segment.

7. The thermal management arrangement according to claim 1, wherein a separately controlled and regulated component cooler heat carrier supply segment provides a circuit having the heat carrier reservoir and component heat exchangers.

8. The thermal management arrangement according to claim 1, wherein a separately controlled and regulated condenser cooler heat carrier supply segment provides a circuit having the heat carrier reservoir, a condenser of the refrigerant circuit, and a heater heat exchanger.

9. The thermal management arrangement according to claim 1,
wherein a separately controlled and regulated cooler heat carrier supply segment provides a circuit having at least one of an evaporator of the refrigerant circuit, of a battery heat exchanger, and or a cooler.

10. The thermal management arrangement according to claim 1,
wherein a separately controlled and regulated component heater heat carrier supply segment provides a circuit having at least one of the heat carrier reservoir, component heat exchangers, or a battery heat exchanger, a cooler, and an evaporator of the refrigerant circuit.

11. The thermal management arrangement according to claim 1, wherein the refrigerant used in the refrigerant circuit is selected from the group consisting of R290, R1270, R134a, R152a, R1234yf, R744, and R600a.

* * * * *